UNITED STATES PATENT OFFICE.

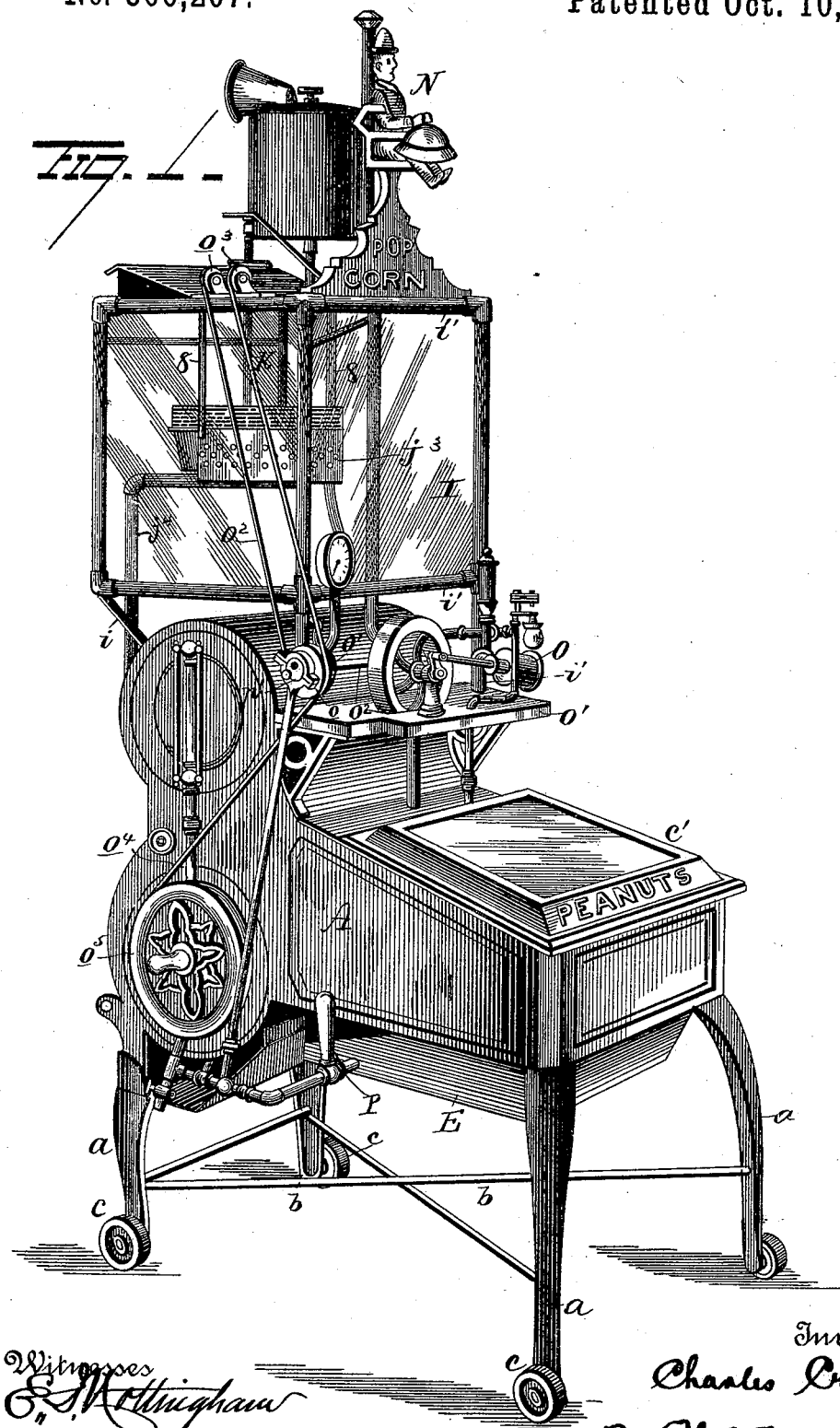

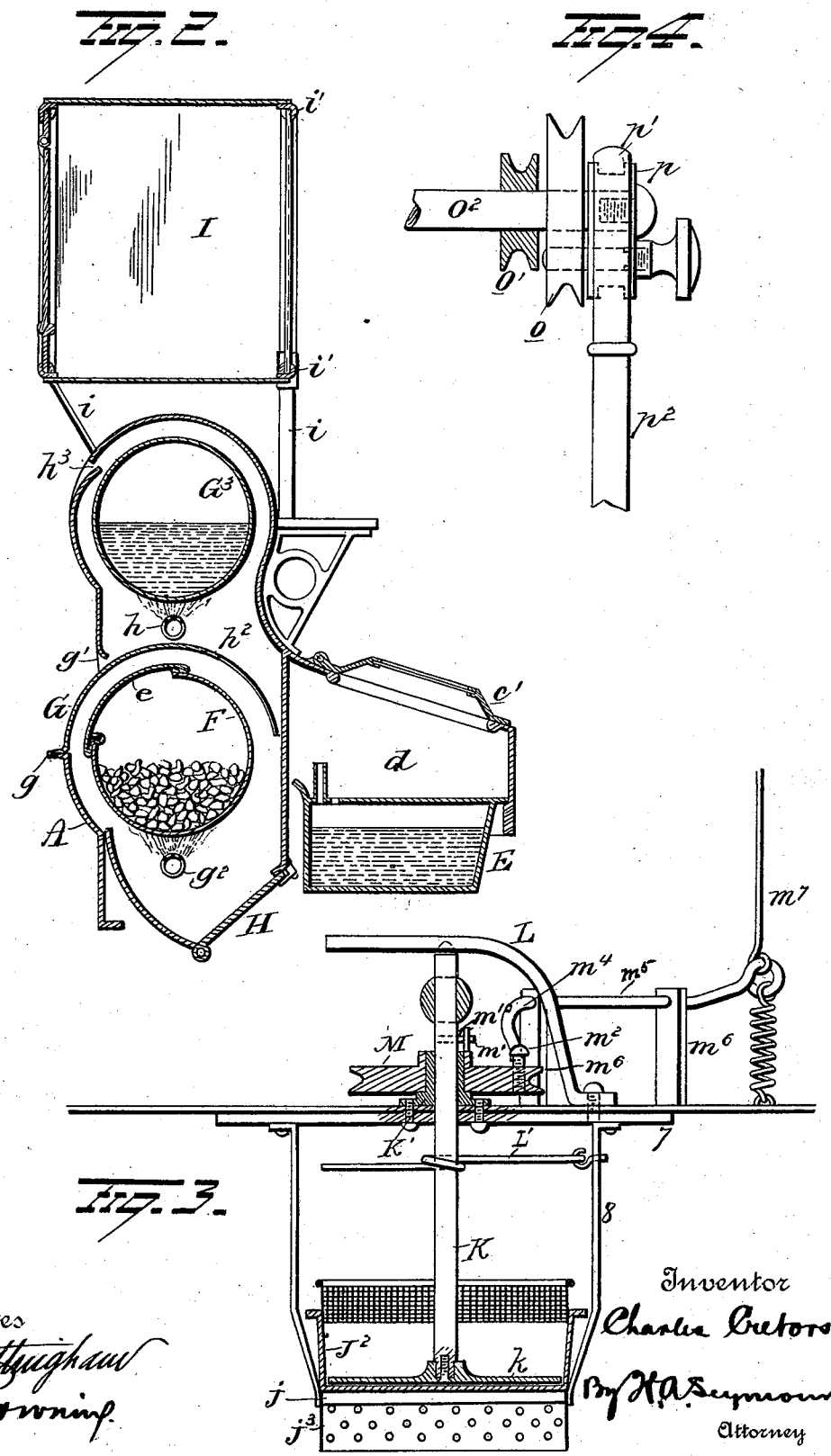

CHARLES CRETORS, OF CHICAGO, ILLINOIS.

PEANUT-ROASTER OR CORN-POPPER.

SPECIFICATION forming part of Letters Patent No. 506,207, dated October 10, 1893.

Application filed August 10, 1891. Serial No. 402,259. (No model.)

*To all whom it may concern:*

Be it known that I, CHARLES CRETORS, of Chicago, in the county of Cook and State of Illinois, have invented certain new and useful Improvements in Peanut-Roasters or Corn-Poppers; and I do hereby declare the following to be a full, clear, and exact description of the invention, such as will enable others skilled in the art to which it appertains to make and use the same.

My invention relates to an improvement in peanut roasters and corn poppers, and it consists in the parts and combinations of parts as will be more fully described and pointed out in the claims.

In the accompanying drawings, Figure 1 is a view in perspective of my improved device. Fig. 2 is a view in section showing the relative position of the several parts. Fig. 3 is a view in section through the corn roasting device, and Fig. 4 is a view of the mechanism for actuating the pump.

A represents a suitable frame preferably of the shape shown mounted on four legs $a$ suitably braced at $b$ and mounted on casters $c$. The top of this frame slopes upwardly from the front, and is provided with the hinged lid $c'$ to the peanut pan $d$ in which the peanuts are placed after being roasted. This lid or cover $c'$ is preferably provided with a glass panel so as to show the contents of the pan. Located below the peanut pan is the water tank E which latter is connected by a pump and pipes to be hereinafter described to the boiler for supplying water thereto. This tank and the water therein, are heated by the exhaust steam from the engine, the said steam being conducted by a pipe (not shown) into the tank, and as the peanut pan is directly above the water tank, it also is heated and the peanuts therein kept warm.

The rear or back of the frame is rounded or curved, and the space therein back of the peanut pan is occupied by the peanut cylinder F. This cylinder is mounted at its ends on suitable trunnions having bearing in the frame A, and is provided with an oblong door $e$ which latter is also curved to conform to the shape of the cylinder. The frame A is provided on its rear side with the sliding door G which latter extends approximately the width of the frame or casing A, is formed in the arc of a circle and is mounted at its ends in curved grooves or guides in which the door slides. The door is provided on its lower edge with a lip $g$ which serves the two fold purpose of a handle for operating same and a stop for engaging the depending projection $g'$ and limiting the inward movement of the door G. To fill the cylinder with peanuts it is simply necessary to slide up door G and turn cylinder F until the door therein registers with the door G. After filling, the door of the cylinder and door G are closed. The burner $g^2$ for heating the cylinder and its contents consists simply of a straight pipe having a series of perforations arranged so as to direct the gas upwardly into contact with the cylinder.

In order to enable me to quickly and rapidly discharge the nuts from the cylinder, I have curved the bottom of the frame or casing A under same and provided a hinged door H at the lowest point thereof. This door is adapted to be turned upwardly and locked by buttons, and when lowered acts as an apron to guide the nuts discharged from the cylinder into a pan or receptacle located under the frame A. By curving the bottom and locating the door or gate at the lowest point under cylinder F, it follows that the contents of the cylinder can be discharged very quickly. Again by this arrangement of parts there are no obstructions to catch and retain any of the nuts, which if not removed by hand would be burned.

The casing or frame A extends upwardly at its rear end, in curved form for the reception of the boiler $G^3$. This boiler is also cylindrical and is located in a plane immediately over the peanut cylinder F and is heated by the burner $h$ which latter is simply a perforated pipe located under the boiler. A partition $h^2$ partly separates the boiler and cylinder and the boiler casing is provided near its top with a draft opening $h^3$. The corn popper I consists essentially of a square or rectangular frame supported on four standards $i$ secured at their bases to the frame or casing A. The standards $i$ or at least the portions thereof constituting corners of the frame are preferably of brass or nickel tubing simply for the purpose of giving the casing a neat and ornamental appearance, and the top and bottom rails $i'$ thereof are also of ornamental finish for the same purpose. These rails $i'$ are made of tubing split as shown, one edge of the split tubes being bent outwardly to form flat seats or bearings for the top and bottom plates of the corn chamber. The top and bottom and rear sides of this chamber are preferably made of sheet metal the rear side or plate being hinged at one side or end to form a door, while the front and two sides thereof are of glass.

Located within the corn chamber I is a metal band $j$ the latter being secured to rods 8 depending from and secured to the top plate of the chamber or to a strip 7 extending across said chamber near the top thereof. This band $j$ supports the pan $j^2$ or if desired the rods 8 may be connected directly to the pan. This pan is made of sheet metal with a wire gauze top or band for preventing the popped corn from flying therefrom, or from wire gauze, and is provided with a depending perforated metallic apron $j^3$ which latter protects the glass faces of the casing from the direct action of the heat. The pan is then heated from a jet in pipe $j^4$ beneath it. K is a shaft passing upwardly through bearing K' in the top of the case and provided at its lower end with a stirrer $k$ which latter is located in close proximity to the bottom of the pan and is designed to prevent the corn from burning. This shaft is prevented from accidental vertical movement by the bracket L which latter is pivoted to the top of the corn chamber or to the frame thereof and projects over and rests on the shaft. To elevate the shaft, when it is desired to remove the corn from the pan the bracket L is turned sidewise and then by grasping knob $m$ and lifting same the shaft and stirrer thereon will be elevated and be held in an elevated position by the wire clutch L'. This clutch is loosely secured to the casing at one side and encircles the shaft in the form of a loop, the said loop being slightly larger than the shaft so that the latter can freely move through same. The clutch permits the shaft to be elevated, but as the clutch is unsupported at its loop end except by its contact with the shaft it follows that it will grasp the shaft on opposite sides and prevent it from descending. To bring the shaft down to its normal position, it is simply necessary to elevate the outer end of the clutch.

Loosely mounted on the bearing K' above the top of the corn chamber is the pulley M, which latter is provided with a pin $m'$ adapted to engage a pin $m^{10}$ projecting at right angles thereto from the shaft K. The pin $m'$ is in the line of the path of the pin $m$ and hence it follows that when the pulley is rotated the shaft will also be rotated. The pulley M is also provided on its upper face with the screw or projection $m^2$, designed to engage the depending arm $m^4$ of the rocking bar $m^5$. This rocking bar is mounted in suitable bearings $m^6$ on the top of the corn chamber, and is slightly bent at its outer ends so that a rocking movement of the bar will depress the rod or cord $m^7$ which latter is attached to the arm or other movable part of a figure N (see Fig. 1) and actuates same for the purpose of attracting the attention of people passing the device. The rod is normally held with its arm $m^4$ in position to be engaged by the screw or projection $m^2$ and hence is actuated once at each revolution of the pulley $m$, and by moving the screw or projection $m^2$ up or down the amount of movement of the rod $m^5$, and consequently the movable member of the figure, can be regulated.

The engine O which actuates all the rotating parts of the apparatus is situated on a bed plate O' supported at both ends by brackets, preferably cast on the end frames that support the boiler. This engine actuates shaft $O^2$ which latter is provided with two pulleys $o$ $o'$, one of which is for a belt $o^2$ that passes upwardly over pulleys $o^3$ to pulley M, while the other is for a belt $o^4$ that passes around pulley $o^5$ attached to a trunnion of the peanut cylinder. Located on shaft $O^2$ adjacent to pulley $o'$ is a loose eccentric $p$. This eccentric $p$ carries a movable plug, and the pulley $o'$ is provided with a perforation adapted to receive one end of the plug. Thus it will be seen that when the plug enters the hole in pulley $o'$ the eccentric is actuated, and when withdrawn from said pulley the eccentric remains idle. Mounted on the eccentric is the eccentric strap $p'$, carrying the pump rod $p^2$ which latter forces the water from the water tank E into the boiler. Water is poured into tank through funnel P, which latter leads to the bottom of the tank, so that when the tank is empty the exhaust steam from the engine can find free escape and indicates the absence of water. The connection of the water pipe to the boiler is made preferably at the bottom of the water gage.

It is evident that numerous slight changes in the form and constructive details might be made without departing from the spirit and scope of my invention. Hence I would have it understood that I do not wish to limit myself to the exact construction shown, but consider myself at liberty to make such changes and alterations as fall within the spirit and scope of my invention, but, Having fully described my invention, what I claim as new, and desire to secure by Letters Patent, is—

1. A corn popper and peanut roaster comprising a casing in which are located a rotary roasting cylinder, a popper, a water boiler, engine, a pan having a hot water tank beneath it, heating jets, pop-corn stirrer, and means actuated by the engine for rotating the roaster and agitating the pop-corn stirrer, substantially as set forth.

2. The combination with a casing having a pop-corn chamber thereon, of a popper suspended within the chamber, a jet beneath the popper, a shield for preventing the flame from striking the walls of the chamber, a stirrer, and means for agitating the latter, substantially as set forth.

3. The combination with a popper chamber, and a popper therein, of an agitator, a shaft for supporting the latter, a clutch for supporting the shaft when elevated from its normal position, means for holding the shaft normally depressed, a pulley on the shaft having a projection, a figure for attracting attention and means extending from the latter to the path of the projection on the pulley to be set in motion periodically for operating the figure, substantially as set forth.

4. The combination with an engine, and a shaft having a pulley secured thereon, and belted to the pulley of a roasting cylinder, of a pump, and connections with a water supply and with the boiler of the engine, the pump piston having a strap head, an eccentric loosely mounted on the shaft and upon which the strap head is mounted, and means for locking said eccentric to the pulley, substantially as set forth.

5. The combination with the pan, and a burner under same, of a vertically movable stirrer shaft having a laterally projecting pin, a bearing for said shaft, a pulley mounted on said bearing and provided with an upwardly projecting pin, a bracket for normally holding the shaft depressed and a gravity clutch for holding it elevated, substantially as set forth.

In testimony whereof I have signed this specification in the presence of two subscribing witnesses.

CHARLES CRETORS.

Witnesses:
JOHN M. KLINE,
J. M. SAVAGE.